Patented Dec. 13, 1938

2,140,401

UNITED STATES PATENT OFFICE 2,140,401

PROCESS OF TREATING WATER

Gail J. Fink, La Grange, Ill., assignor to National Aluminate Corporation, Chicago, Ill., a corporation of Delaware No Drawing. Application December 20, 1935, Serial No. 55,363

10 Claims. (Cl. 210—23)

The present invention relates to the control of algae in stored water, such for example as in ponds, lakes, reservoirs, storage tanks, cooling systems, spray ponds, and the like.

Algae, broadly expressed, are aquatic plants which may be either macroscopic or microscopic, but usually are visible to the naked eye, although the individual plants may be very small. Thus, in ponds and lakes which are stagnant, or in which the water is not in very active movement, large quantities of these algae will grow forming a bed thereof at the bottom and sides of the lake or pond or, by rising to the surface, forming the well known green scum thereon.

This difficulty is particularly noticeable in artificial storage reservoirs, swimming pools and the like, where the algae, particularly of the floating variety, form a great nuisance in that they interfere with the purity of the water and its desirability for swimming or other recreation.

A secondary difficulty encountered with algae is that they will become deposited on heating or cooling coils which might be immersed in the water in which they are to be found, while they are also often drawn into the water jackets and water pipes of cooling systems from the pond which forms the source of supply of the cooling water, with the result that the jackets and water lines become clogged with an accumulation of vegetable matter.

It is therefore the object of the present invention to kill algae already contained in water supplies as well as to treat the water in such a way as to prevent the growth of algae therein and to kill any algae which may find their way into the water from an extraneous source.

Algae are a genus of plants of which there is a very large number of varieties, and therefore for the purpose of the present invention and the interpretation of the claims appended to the present specification the word "algae" is used to represent any and all variety of aquatic growth, but more particularly the type commonly known as Oscillaria and Dictyosphaerium.

The control of the algae in the water, and particularly the killing thereof, is accomplished in accordance with the present invention by supplying to the water, dissolving therein or adding thereto, either dry or in solution, two salts, namely, copper sulfate and ammonium sulfate. It has already been proposed in the past to employ copper sulfate alone for this purpose, but it was discovered that copper sulfate alone has to be used in quantities which are so large as to be very undesirable for many purposes. It is obvious that a large amount of a comparatively poisonous salt such as copper sulfate is very undesirable in water that is used for swimming as well as in water that is used in cooling systems, spray ponds, and as a general source of supply of water for boilers and industrial uses.

It has been discovered that by admixture with ammonium sulfate or by the simultaneous presence of ammonium sulfate in the water, the killing power of copper sulfate for algae is very materially increased. Without in any way limiting the present invention, it may be stated as an example that one part by weight of commercial hydrated copper sulfate ($CuSO_4.5H_2O$) to one part by weight of ammonium sulfate ($(NH_4)_2SO_4$) is the most desirable proportion of these two materials. The water may if desired, but not necessarily, also be treated with other treating materials which may affect the qualities of the water relative to its liability to form incrustations or scale. Thus, for example the copper sulfate—ammonium sulfate treatment may be, in accordance with the present invention, also applied to water which has been treated with encrusting preventing agents, as for example tannin and sodium phosphate.

A secondary feature of the present invention lies in the discovery that the presence of ammonium sulfate in the water will permit greater doses of chlorine therein without producing a pronounced odor or taste or an irritating effect upon bodies of bathers which frequently occurs when a swimming pool is treated with chlorine and copper sulfate or with copper sulfate alone. For example, it was found in connection with a specific swimming pool that during hot weather considerable difficulty was experienced with bacteria and algae pollution in the pool. In order to control the bacteria, it was necessary to use an unusually high chlorine dosage. It was found, however, that as a result of the presence in the water of ammonium sulfate together with copper sulfate, the presence of the chlorine was not noticeable to the bathers and hence no complaint was registered. The pool, when thus treated, was at all times maintained in perfect hygienic condition.

In certain parts of the United States cooling water supplies were encountered which had been treated with as much as 75 parts per million of chlorine, but even then the algae were not killed. However, by using copper sulfate as well as ammonium sulfate in this water, complete killing of the algae was readily effected.

As an example of the efficacy of the treatment of water by the present invention, it may be recited that, for example, with a given type of algae, namely, Dictyosphaerium, 100 parts per million of ordinary copper sulfate ($CuSO_4.5H_2O$) were necessary to kill the algae, but when using only 5 parts per million of copper sulfate plus 5 parts per million of ammonium sulfate (making 10 parts per million in all) complete killing of the algae was effected. As a matter of comparison, it may be stated that as much as 25 parts per million of the highly poisonous mercuric chloride (bichloride of mercury) were necessary to obtain the same degree of killing effect, while 25 parts of ammonium sulfate alone were necessary to kill the algae. It is therefore most surprising to find that as little as 10 parts per million of a mixture of copper sulfate and ammonium sulfate have as great killing power for algae as do 100 parts of copper sulfate alone.

In commercial practice, for example, to insure the killing of the rather difficultly controlled dictyosphaerium, treatment of the water with as little as 15.6 parts per million of chlorine and 5 parts per million each of copper sulfate and ammonium sulfate was effective in killing all algae in the water, thus rendering it perfectly free thereof and safe for use in swimming pools and the like. Under some conditions it was even found possible to use as little as 3 parts per million of copper sulfate and 3 parts per million of ammonium sulfate in order to control the algae in the water.

However, as much as 100 parts per million of the copper sulfate and ammonium sulfate, or their equivalents, may be employed to complete the elimination of the algae. In every case, however, the conjoint use of ammonium sulfate with the copper sulfate is much more efficient than the copper sulfate alone.

In carrying out the invention on a commercial scale, the process is practiced by dissolving ammonium sulfate and copper sulfate separately and pouring the resulting solutions into the water under such conditions as to insure rapid diffusion of the copper sulfate and ammonium sulfate in the water, or the two chemicals may be dissolved in the same quantity of water and poured into the water to be treated, or the dry chemicals, namely, copper sulfate and ammonium sulfate, may be physically mixed and supplied to the user with directions to dissolve the same in water and pour the resulting solution into the lake, pond or storage reservoir, or else to sprinkle the mixture over the surface of the water, thereby dissolving it therein directly.

In the hereunto appended claims it is to be understood that the treatment may be carried out in any of the above indicated ways, provided only that copper sulfate and ammonium sulfate be used simultaneously, that is, in the presence of each other, irrespective as to how the mixture is effected.

As an alternative, it may be mentioned that metallic copper or a soluble copper oxide, hydroxide or carbonate, or other acid soluble copper compound, may be dissolved in an excess of sulfuric acid, whereupon the excess is neutralized with ammonia or ammonium hydroxide so as to produce a mixture of copper and ammonium sulfate. As a further alternative, cuprammonium sulfate may be used instead of the physical mixture of copper sulfate and ammonium sulfate, the main object being to have present in the water the following ions: copper, $NH_4$ and $SO_4$.

It should also be understood that other water-soluble salts of copper and ammonium may be substituted for the sulfates; thus, for example, copper chloride and ammonium chloride or copper nitrate and ammonium nitrate may be used. Copper chloride and ammonium sulfate, or similar mixtures of salts of two different types, may also be used. The sulfates, however, are the most desirable because they are the least expensive and most readily available.

I claim:

1. A composition for controlling or killing algae in water which comprises a mixture of substantially equimolecular amounts of a water-soluble copper salt and a water-soluble ammonium salt.

2. A composition for the control of algal growth in water which comprises a water soluble mixture of an ammonium salt and a copper salt.

3. A composition for the control of algal growth in water which comprises a mixture of ammonium sulphate and copper sulphate.

4. A composition for the control of algal growth in water which comprises a mixture of about equal parts of ammonium sulphate and copper sulphate.

5. Water protected against the growth of algae therein containing in solution less than about one hundred parts per million of a mixture of an ammonium salt and a copper salt.

6. Water protected against the growth of algae therein containing less than about one hundred parts per million of a mixture of ammonium sulphate and copper sulphate.

7. The process for the control of algal growth in water which comprises adding to the water in amounts of about three to one hundred parts per million a soluble substance giving rise to ammonium, copper and sulphate ions in the solution.

8. The process for the control of algal growth in water which comprises adding to the water a mixture of ammonium sulphate and copper sulphate.

9. The process for the control of algal growth in water which comprises adding to the water a mixture comprising substantially equal amounts of ammonium sulphate and copper sulphate.

10. The process for killing algae of the genus Dictyosphaerium in water which comprises adding to the water a mixture comprising substantially equal amounts of ammonium sulphate and copper sulphate in amounts of from about three to one hundred parts of the mixture per million parts of water.

GAIL J. FINK.